United States Patent

Arnberg

[11] Patent Number: 5,927,185
[45] Date of Patent: Jul. 27, 1999

[54] TOOL FOR EGG BOILING

[76] Inventor: Sverker Arnberg, Lillkyrka G:a Prästgård, S-745 97 Enköping, Sweden

[21] Appl. No.: 09/117,807
[22] PCT Filed: Feb. 5, 1997
[86] PCT No.: PCT/SE97/00176
  § 371 Date: Aug. 6, 1998
  § 102(e) Date: Aug. 6, 1998
[87] PCT Pub. No.: WO97/28728
  PCT Pub. Date: Aug. 14, 1997

[30] Foreign Application Priority Data

Feb. 9, 1996 [SE] Sweden .................................. 9600481

[51] Int. Cl.⁶ ..................................................... A47J 43/28
[52] U.S. Cl. ................................. 99/440; 30/324; 30/325; 30/327; 99/495; D7/691
[58] Field of Search ...................... 99/495, 440, 496–500, 99/403–410, 568, 571, 577, 581, 582; 30/324, 325, 327; D7/691

[56] References Cited

U.S. PATENT DOCUMENTS

| D. 115,515 | 7/1939 | Greenberg ............................ D7/691 X |
| D. 245,385 | 8/1977 | Ashton ...................................... D7/691 |
| 1,948,880 | 2/1934 | Hamm ....................................... 30/30 |
| 3,721,180 | 3/1973 | Strang ....................................... 99/571 |
| 3,727,306 | 4/1973 | Patik ...................................... 30/324 X |
| 3,905,287 | 9/1975 | Vaca ......................................... 99/571 |
| 3,942,427 | 3/1976 | Vaca ..................................... 99/580 X |
| 4,106,402 | 8/1978 | Gevas .................................. 99/582 X |
| 4,438,564 | 3/1984 | Ashton ....................................... 30/324 |

FOREIGN PATENT DOCUMENTS 378936  8/1923  Germany .
435675  10/1984  Sweden .

*Primary Examiner*—Timothy F. Simone
*Attorney, Agent, or Firm*—Young & Thompson

[57] ABSTRACT

A tool for egg boiling is provided which includes a handle (2) and a concave liquid draining element located at the one end of the handle for supporting an egg. The tool shaft is provided with a resilient tongue (23), one end of which is fixed to the shaft, and a free end of which carries a spike (24) with an orientation which is perpendicular relative to the tongue for picking a hole in the shell of the egg (7). The shaft forms a guide (21) in order to center, at least in one dimension in the plane of the tongue, the egg in relation to the spike. The guiding establishes a predetermined distance between the end of the egg and the spike of the tongue when the tongue is in a non-loaded condition.

6 Claims, 1 Drawing Sheet

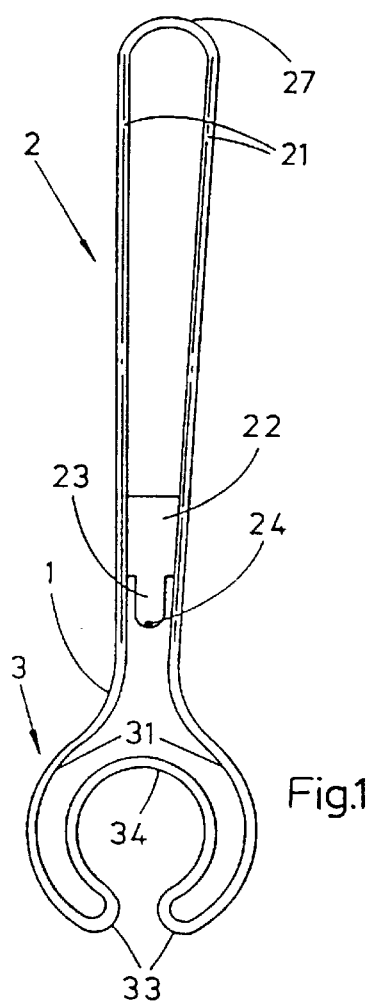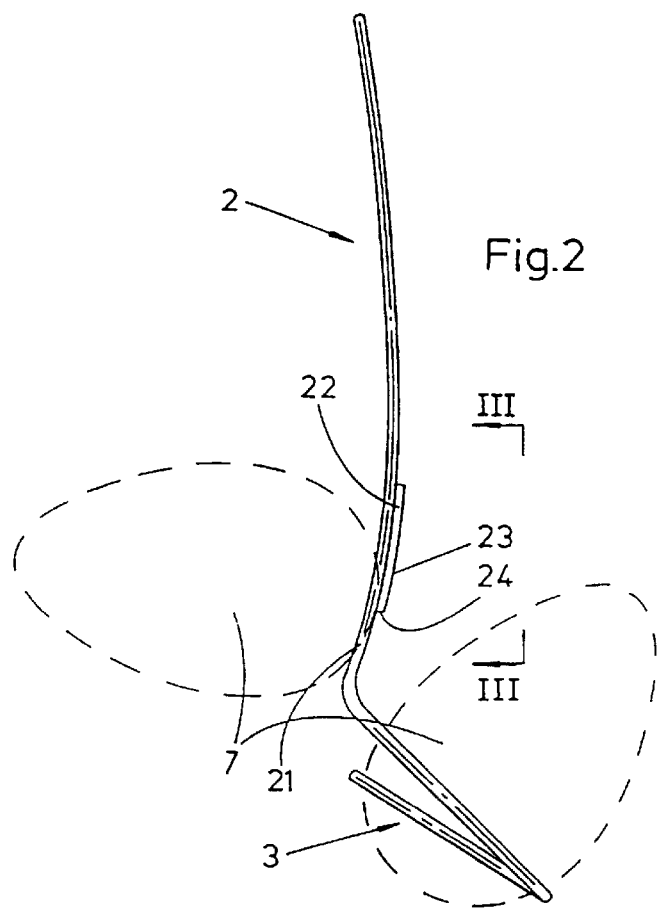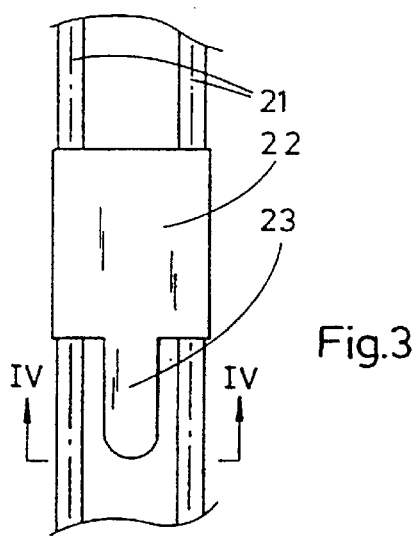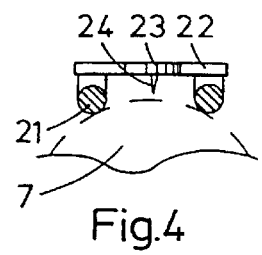

TOOL FOR EGG BOILING

TECHNICAL FIELD

The present invention relates to a tool for use in connection with egg boiling.

In particular, the invention relates to a tool of the type comprising a handle or a shaft and a concave liquid draining supporting element, located at the end of the handle, for supporting an egg.

BACKGROUND ART

A tool of this kind is known from SE-B-435 675.

Tools of this kind are used in connection with the boiling of eggs, whereby a raw egg is placed in the supporting element of the tool, and is lowered down to the bottom of a pot, and the emptied element is then raised out of the water. When the egg has boiled for an appropriate period of time, the tool is once again lowered into the hot water, and the boiled egg is brought into reception in the supporting element of the tool, and then the tool together with the egg is lifted up. By the ability of the supporting element of the tool to drain liquid, no significant amount of hot water will be removed from the pot by the tool together with the egg. The boiled egg may then be placed in cool water for cooling, or else the egg, carried by the tool, may be cooled under running cold water, the draining feature of the tool affording a uniform and good liquid cooling of the egg.

To minimize the risk of the egg cracking during boiling, it is furthermore advantageous to pick a hole in the bottom end of the egg, i.e. the end with the bigger radius, by means of a pin or a spike. Devices for performing such hole picking are known per se, but they constitute a separate device.

DISCLOSURE OF THE INVENTION

An object of the invention is to provide the egg boiling tool with a device for picking a hole in the egg-shell, using the basic configuration of the tool for supporting the use of the hole picking device.

A further object of the invention is to provide a design for the supporting element of the tool, which makes the tool suitable for use as a stirring tool in the preparation of scrambled eggs or an omelet in a frying pan, which object also includes designing the tool in such a way as to render it easy to clean.

This invention achieves these and other objects by providing the tool of the present invention as described herein.

The tool, in a presently preferred embodiment, comprises two generally parallel and spaced apart string elements, with a plate joining and interconnecting said two string elements. The plate element has a freely depending, resiliently flexible tongue mainly extending in the plane formed by the string elements. The longitudinal centre axis of the tongue is located along a line between the two string elements, the tongue plate at its free end carrying a spike for picking a hole in the "blunt" end of the egg, said spike extending transversally relative to the plane of the tongue. The plate element touches the two string elements on the one side of the handle, the spike extending through the space between the string elements towards a plane which is a tangent to the two string elements on the second main surface of the handle.

The string elements of the handle are spaced apart, in the area of the tongue, by a distance of 1–2 cm, and the string material has a diameter of approximately 3 mm. The length of the spike may be around 2.5 to 3.5 mm. The shaft, i.e. both of the string elements, may be bent in such a way as to make the string elements and the tongue diverge in the direction of the free end of the tongue. Since the plate element interconnects the string elements, said string elements are prevented from changing their relative spacing when an egg is placed against the strings at the location of the spike. Thus the spike will be positioned at a quite accurately predetermined distance from the end of a normal egg. The egg is centered between the strings, and to the extent that the shaft is bent in the area of the spike, a defined position of the egg is also established along the shaft.

In a preferred embodiment the tool is formed from a single endless metallic string with a circular cross-section, the tool, apart from the string, being comprised solely of the plate with the tongue and the spike.

In a particularly preferred embodiment of the tool, the supporting element is formed by the two mainly parallel string sections of the shaft transcending into the supporting element, said supporting element formed by the two string sections being bent into two mainly semi-circular arcs, forming a non-closed supporting loop, the string sections at the ends of the arcs remote from the shaft transcending into an "Omega"-shaped circular plane loop, the plane of which loop forms an acute angle with the plane defined by the arcs. The diameter of the "Omega"-shaped loop is smaller than that of the loop defined by the arcs, so as to provide a stable resting position for an egg in the support defined by the hooks.

BRIEF DESCRIPTION OF THE DRAWINGS

An illuminating embodiment of the invention will now be described by way of example, reference being made to the accompanying drawings, in which:

FIG. 1 shows, schematically, a view towards the back of the tool according to the invention, FIG. 2 shows an elevational view of the tool of FIG. 1, FIG. 3 shows a view along the line III—III of FIG. 2, and FIG. 4 shows a view, in section, along the line IV—IV of FIG. 3.

MODE FOR CARRYING OUT THE INVENTION

The drawing shows a tool formed by a metallic string 1 made from a non-corrosive metallic material. The string 1 is formed into a tool shaft 2 and a liquid draining supporting means 3 at one end of the shaft. The shaft is thus formed by two generally parallel string sections 21, which are connected, at the free end of the shaft, by a lyre-shaped string section. The support 3 is formed by the string sections 21 being formed into two generally semi-circular arcs 31 which together form a first, flat non-closed loop, the plane of which is offset from the plane formed by the string sections 21. At the ends of the arcs 31 remote from the shaft the string is bent into an additional, generally plane and "Omega"-shaped loop 34, the ends of which connect to the loop formed by the arcs 31 at the ends 33 of the arcs 31. The two loops 31 and 34 are respectively generally co-axial and located on different levels, the loop 34 having a diameter which is smaller than that of the loop defined by the arcs 3 1, so that an egg 7 may rest in a stable manner in the support 3 on its top side, from which the shaft projects.

In the area of the shaft 2 connecting to the support 3 a plate element 22 is mounted to the one side of the shaft. The plate element 22 interconnects the string sections 21, and is furthermore provided with a tongue 23 whose longitudinal direction is located between the sections 21, the tongue 23 having its free end directed towards the support 3. A spike 24 extends transversally relative to the plane of the tongue 23. The two generally parallel string sections 21 are bent in order for the shaft 2 to have a concave back side in the area of the spike 24.

The distance between string sections 21 is chosen so that the thumb of the user, pressing against the tongue 23 to cause the pick 24 to penetrate the egg-shell 7, will not be allowed to pass inbetween the sections 21.

By the distance defined between the sections 21, the distance between the egg 7 and the apex of the spike 24, when the tongue 23 is in a non-loaded condition, is also defined. Further, the apex of the spike 24 will be retracted in the space between the two parallel tangenting planes of the two string elements 21 on the two sides of the shaft 2.

The person skilled in the art appreciates that the "Omega"-shaped supporting loop 34, together with the loop which is formed by the arcs 31 and angled from this area, affords a favourable stirring effect when the tool is used for stirring egg-batter in connection with the preparation of scrambled eggs, or an omelet.

Furthermore, by the support 3 being formed from a round string material, the string section being spaced apart generously, the tool is easy to clean after the preparation of scrambled eggs.

The invention claimed is:

1. A tool for egg boiling, comprising:

a handle extending from a proximate end to a distal end, said handle comprising an elongated first segment spaced from an elongated second segment;

an egg support element extending from said proximate end;

a resilient tongue positioned between said proximate end and said distal end, said resilient tongue comprising (a) a first portion attached to said first segment and to said second segment adjacent a first length of said first segment and an opposite and parallel second length of said second segment, respectively, and (b) a second portion extending from said first portion; and a spike having an apex, said spike extending from said second portion and said apex extending between said first length and said second length, said spike being substantially perpendicular to said second portion, said first length and said second length being spaced sufficiently (i) to support an end of an egg a distance from said apex when said resilient tongue is in a non-loaded mode, and (ii) to permit said apex to penetrate said end of said egg when said resilient tongue is in a loaded mode.

2. The tool of claim 1 wherein said first length and said second length are each concave in a direction away from said apex.

3. The tool of claim 1 wherein said egg support element comprises an arc shaped elongated first section extending from said first segment at said proximate end, and an arc shaped elongated second section extending away from said second segment at said proximate end, said first section and said second section together forming a first non-closed loop extending in a first plane, an arc shaped elongated third section extending towards said proximate end from a distal end of said first section, and an arc shaped elongated fourth section extending towards said proximate end and to said third section from a distal end of said second section, said third section and said fourth section together forming a second non-closed loop extending in a second plane, said third section and said fourth section together having an Omega-shape, said second non-closed loop being within said first non-closed loop, said second non-closed loop having an effective diameter smaller than an effective diameter of said first non-closed loop, and said second non-closed loop being below said first non-closed loop when said distal end of said handle is extended vertically upward.

4. The tool of claim 3 wherein said first plane forms an acute angle with said second plane.

5. The tool of claim 3 wherein said first length and said second length are each concave in a direction away from said apex.

6. The tool of claim 4 wherein said first length and said second length are each concave in a direction away from said apex.

* * * * *